United States Patent Office 3,482,798
Patented Dec. 9, 1969

3,482,798
TAPE MEASURE MEANS
Toshiji Kawaguchi, Tokyo, Japan, assignor to Kabushiki
Kaisha Tajima Seisakusho, Tokyo, Japan
Filed Dec. 19, 1966, Ser. No. 602,933
Claims priority, application Japan, Apr. 16, 1966,
41/23,809
Int. Cl. B65h 75/48
U.S. Cl. 242—107.3                    8 Claims

ABSTRACT OF THE DISCLOSURE

A tape measure device of the type providing automatic take-up of the extended tape, including a take-up reel, rotatably mounted on an integral stud within a housing. The reel is attached to a coil spring serving to bias the reel when the tape is extended. A manually operated brake pivotally mounted to the housing and including an integral elastic biasing member cooperates with the outer portion of the reel so as to engage the reel and maintain it in lock position, thereby prohibiting take-up of the extended tape until the brake is depressed and disengaged from the reel.

---

This invention relates to a tape measure means, more particularly to a tape measure means having an automatic take up means equipped with an improved brake device for regulating the movement of a graduated tape measure thereof in drawing out and taking up operations thereof.

In a conventional tape measure means of a comparatively short length, say about two meters, having an automatic take up means, there is provided a spring means therein to apply a set of frictional thrust forces to a take up reel thereof on both side surfaces thereof so as to counteract against a force for taking up the tape measure. Thereby, any desired length of the tape measure can be drawn out of the take up reel while holding the take up reel stationary after releasing that desired length of the tape measure therefrom, and at the same time, the speed of taking up the tape measure onto the take up reel can be also controlled manually by regulating the aforementioned thrust forces. However, in the case of a long tape measure, say about five meters long, the overall diameter of a take up reel having such long tape measure wound thereon becomes considerably large, and a large thrust force is required for controlling the movement of such tape measure. The aforementioned conventional structure is suitable for a comparatively short tape measure but not for a long tape measure, as it is made necessary in the case of the long tape measure to use a large spring means for effecting regulation of the tape movement, which necessitates the use of an excessively large force for drawing the long tape measure out of the take up reel.

In another conventional tape measure means, a resilient lug means is pivotally secured to a casing of the tape measure at an outlet opening thereof in such a manner that the tape measure moves out of the casing through a gap formed between the pivotal lug means and an edge of the opening thereof. Thereby a braking force is applied to the tape measure by the resilient lug means so as to hold the tape measure at any point after drawing out or taking up a desired length thereof. The use of such resilient lug means has a disadvantage in that the surface of the measure tape is abraded by the lug means, and the graduations provided on the surface of the tape measure are apt to be erased thereby.

Therefore, it is an object of the present invention to obviate all such difficulties of conventional structure for a long tape measure by providing a novel tape measure means having a take up means equipped with an excellent brake device, which is adapted to hold securely the tape measure at any point thereof with a proper braking force after drawing out or taking up a desired length of the tape measure, to be controlled easily in a simple manner, and to be free from abrasion of the graduated surface of the tape measure.

According to the present invention, there is provided a tape measure means capable of automatically taking-up a tape measure comprising a casing including a first bowl-shaped half and a second bowl-shaped half, the first half having a central cylindrical stud extending toward the open side of the bowl shape, said second half having a central annular projection extending toward the open side thereof; a plurality of screws or like means securing the first and second halves together so as to fit the stud of the first half in a recess defined by the annular projection of the second half; a reel rotatably supported by the stud within the inside of the casing, said reel including a drum portion having a diameter larger than that of the stud and disposed in a concentric relation with the stud; a tape measure wound on the drum of the reel; a coil spring disposed between the stud and the drum, and having one end secured to the stud and the opposite end connected to one end of the tape measure on the drum, the coil spring biasing the reel in a direction to take up the tape measure released therefrom; a brake lever pivotally supported by the casing at an intermediate point thereof; a frictional brake shoe secured to one end of the brake lever and engageable with the peripheral edge of the reel; and a resilient means engaged with the opposite end of the brake lever and adapted to urge the brake lever in a direction to keep the brake shoe normally in contact with the peripheral edge of the reel.

For a better understanding of the invention, reference is made to the accompanying drawings, in which.

Figure 1:
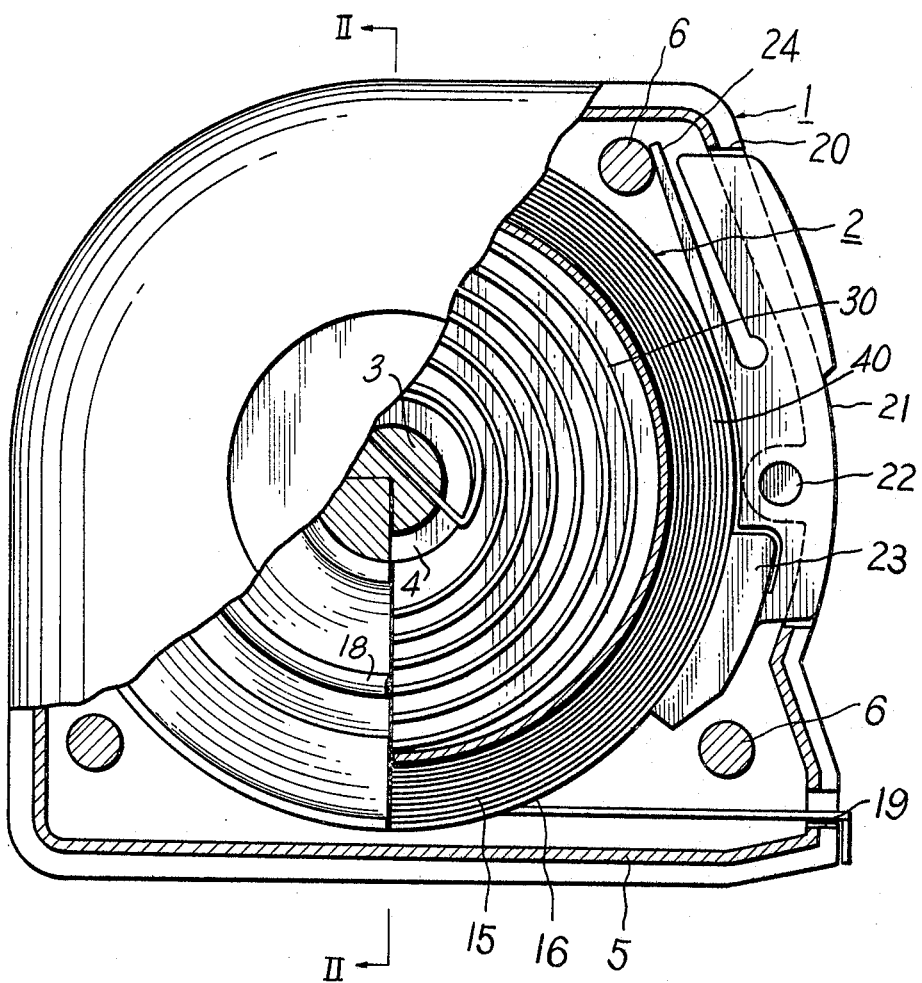
FIG. 1 is a plan view of a tape measure embodying the invention, shown with a part of a lid thereof cut off.
Figure 2:
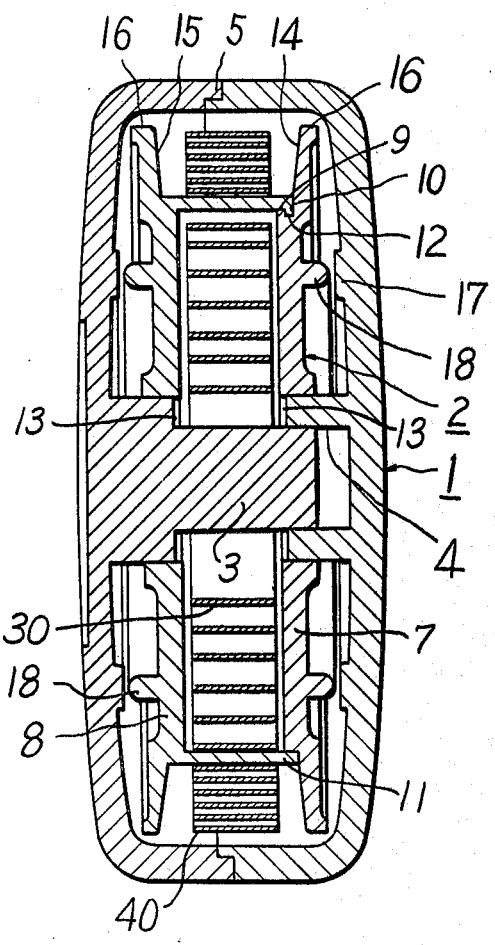
FIG. 2 is a sectional view of the same, taken along the line II—II of FIG. 1.

Referring to FIGS. 1 and 2, a generally square shaped outer casing 1 is preferably made of two bowl shaped sections so as to facilitate pivotal support of a take up reel 2 therein. One of the two bowl shaped sections is provided with an embossed shaft member 3 at the central portion thereof so as to be fitted in a bearing member 4 formed on the other section as an integral part thereof, and a projected flange 5 is formed around the outer peripheral edge of the former bowl shaped section so as to be fitted in a mating recessed portion formed on the cooperating outer peripheral edge of the latter bowl shaped section. Screws 6 are mounted on the outer casing 1 at corner portions thereof so as to hold the two bowl shaped sections together in correct relations.

In a preferred embodiment of the invention as shown in FIGS. 1 and 2, the take up reel 2 comprises a disk member 7 and a drum member 8. The disk member 7 consists of a flat circular portion 9 and an outer flange portion 14 extending outwardly from the periphery of the circular portion 9, while the drum member 8 consists of a cylindrical portion 11 and an outer flange portion 15 extending outwardly from the cylindrical portion 11. A plurality of recesses 10 are bored on the outer periphery of the circular portion 9, so that mating bosses 12 formed on the tip edge of the cylindrical portion 11 are clicked into the recesses 9, as shown in FIG. 2.

Both the disk member 7 and the drum member 8 are provided with circular central openings 13, so that the embossed shaft member 3 and the cylindrical edge of the bearing member 4 can be rotatably fitted in the central openings 13.

A coiled take up spring 30 is wound around the outer surface of the shaft member 3 while securing one end thereof on the shaft member and extending the opposite end thereof through the outer wall of the cylindrical portion 11 so that said opposite end can be connected to the inner end of a tape measure 40. The cylindrical portion 11 is used to take up the tape measure on the outer surface thereof. The outer flange portions 14 and 15 of the disk member 7 and the drum member 8 act as the guide wall of the tape measure for ensuring proper motion and lamination thereof in the space between the outer surface of the cylindrical portion 11 and the cylindrical inner surface of the casing 1.

Peripheral surfaces of the outer flange portions 14 and 15 are adapted to act as spaced brake drums 16.

A pair of annular slidable seat surfaces 17 are formed on the opposite inner circular surfaces of the outer casing 1 so as to cooperate with annular projections 18 formed on the outside surfaces of the take up reel 2 with narrow gaps between them, as shown best in FIG. 2. Thereby, the take up reel is prevented from rocking in the axial direction of the shaft member 3.

There are formed an outlet opening 19 to allow movement of the tape measure therethrough and another opening 20 for operation of the tape measure means are formed on one surface of the generally square peripheral surface of the outer casing 1, say the right hand side surface as seen in FIG. 1. The inner bottom surface of the outlet opening 19 may be curved in accordance with the arcuate cross section of the tap measure. A brake lever 21 is pivotally supported by a pin 22 at the opening 20, and the pin 22 is in turn received in bearing holes bored on the bowl shaped sections of the casing 1.

A brake shoe 23 is firmly secured to the brake lever 21 at one end thereof, and an elastic member 24 is connected on the opposite end thereof. In the particular embodiment of FIG. 1, both the shoe 23 and the elastic member 24 are formed as integral parts of the lever 21. One end of the elastic member 24 is urged against one of the screws 6 acting as a stopper of the elastic member. When no outside force is applied to the brake lever 21, the elastic force of the elastic member 24 is exerted on the brake shoe 23 through the lever 21, so as to produce a brake force acting on the brake drum 16. The brake force has at least a component in the normal direction of the take up reel, which is large enough to hold the take up reel 2 stationary.

When the brake lever 21 is manually depressed against the elastic force of the resilient member 24, then the brake force acting on the brake drum 16 is released, so that the tape measure can be drawn out of the reel 2 with ease and the tape measure previously drawn out can be taken up automatically substantially without any friction against the taking up operation.

Upon reduction of the depressing force during the taking up operation, a strong brake force due to the elasticity of the resilient member 24 is applied to the brake drum 16 on the outer peripheral surface of the take up reel 2, and hence taking up movement of the reel is effectively braked even when the automatic taking up force is considerably large. Thereby, the tape measure can be stopped and held at any desired point thereof.

Figure 3:
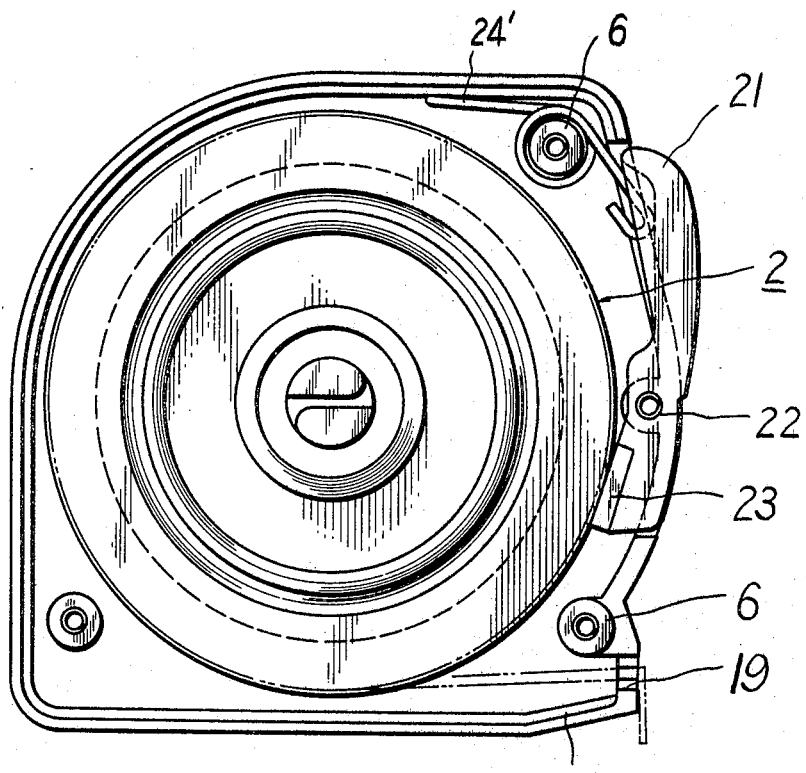
FIG. 3 is a view similar to FIG. 1, illustrating another embodiment of the invention.
Figure 4:
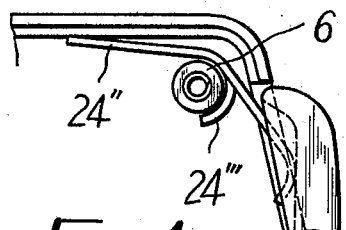
FIG. 4 is a diagrammatic illustration of the manner in which an elastic member usable in the tape measure means of the invention is mounted on a casing thereof.

The configuration of the elastic member 24 is not restricted the one as shown in FIG. 1, but it can be a coiled spring 24' as shown in FIG. 3, or a leaf spring 24" as shown in FIG. 4. Referring to FIG. 3, the coiled portion of the coiled spring 24' is fitted to the screw 6, while resting one end thereof against the inner wall of the outer casing 1 and urging the brake lever 21 with the opposite end thereof. In FIG. 4, the leaf spring 24" can be used in the similar manner to that of the coiled spring 24' of FIG. 3, except a claw element 24''' carried by the leaf spring, which is used to secure the leaf spring 24" to the screw 6.

In different embodiments of the present invention described hereinbefore referring to the accompanying drawings, the outer casing 1 and the take up reel 2 can be made of synthetic resins by means of a known shaping process. Accordingly, the tape measure of the invention can be assembled very easily.

As described in the foregoing, according to the present invention, a take up reel itself of the tape measure means is utilized as a brake drum for stopping the tape measure at a desired point, thereby an effective braking force is produced for stopping and holding the tape measure at the desired point after drawing out or taking up any desired length of the tape measure, regardless of the overall length of the tape measure. Thus, with the tape measure means of the invention, the movement of a tape measure of any length can be controlled with ease. Moreover, there is no danger of abrading the graduated surface of the tape measure in the tape measure means of the invention. Therefore, the invention contributes greatly to the industry.

What I claim is:

1. A tape measure device having an automatic take-up means equipped with a brake device, comprising; an outer casing, a tape measure, a take-up reel rotatably supported within said casing, said reel being biased so as to take up said tape measure released therefrom, a brake lever pivotally supported by the outer casing, said brake lever having one end thereof bifurcated so as to form an elastic member, the opposite end of the brake lever provided with a brake shoe which engages the outer peripheral surface of the take-up reel, said elastic member arranged generally between said reel and the outer portion of the brake lever and engaged within said casing, whereby the brake lever applies a braking force to the take-up reel responsive to the urging action of the elastic member unless the brake lever is acted on by an external force directed against the urging action of the elastic member.

2. A tape measure means according to claim 1, wherein said braking force has at least a component in the normal direction of the take-up reel.

3. A tape measure means according to claim 1, wherein said elastic member is formed as an integral part of said brake lever.

4. A tape measure means according to claim 1, wherein said member at said opposite end of the brake lever is a separate brake shoe carried by said brake lever.

5. A tape measure device as in claim 1 wherein said casing comprises two halves secured together by screws and said elastic member engaging one of said screws so as to urge said braking shoe in contact with the peripheral edge of said reel.

6. A tape measure means capable of automatically taking up a tape measure, comprising a casing including a first bowl-shaped half and a second bowl-shaped half, said first half having a central cylindrical stud extending toward the open side of the bowl-shape, said second half having a central annular projection extending toward the open side thereof; said first and second halves secured together so as to fit said stud of said first half in a recess defined by said annular projection of said second half; a reel rotatably supported by said stud within said casing, a tape measure wound on said reel; a coil spring disposed around said stud, and having one end secured to said stud and the opposite end connected to one end of said tape measure, said coil spring biasing said reel in a direction to take up the tape measure released therefrom; a brake lever pivotally supported by said casing; a frictional brake shoe secured to one end of said brake lever and engageable with the peripheral edge of the reel; said brake lever having the opposite end thereof being bifurcated so as to form a depressing button representing an outer piece of the bifurcated portion and an elastic member representing an inner piece of the bifurcated portion, said elastic member engaged within said casing so as to urge said brake lever in a direction to keep said brake shoe normally engaged with the peripheral edge of said reel.

7. A tape measure as defined in claim 6 wherein said brake lever is made of plastic material.

8. A tape measure as defined in claim 6 wherein said inner piece of said bifurcated portion of said brake lever is a leaf spring integrally secured thereto.

References Cited

UNITED STATES PATENTS

| | | | |
|---|---|---|---|
| 352,926 | 11/1886 | Meisselbach | 242—84.53 |
| 583,830 | 6/1897 | Wiley | 242—107.3 |
| 655,052 | 7/1900 | Brunello | 242—84.8 |
| 1,831,666 | 11/1931 | Jacobia | 242—107.6 |
| 2,222,409 | 11/1940 | Gottlieb | 242—107.3 |
| 2,333,632 | 11/1943 | Benson | 242—84.53 X |
| 2,672,303 | 3/1954 | Smith | 242—96 |
| 3,061,232 | 10/1962 | Clark | 242—84.53 |

MERVIN STEIN, Primary Examiner

W. H. SCHROEDER, Assistant Examiner

U.S. Cl. X.R.

242—84.53, 99